March 10, 1942.  E. W. BECK ET AL  2,275,602
LIGHT DIFFUSING LENS
Filed Oct. 3, 1938
Fig. 1.
Fig. 2.
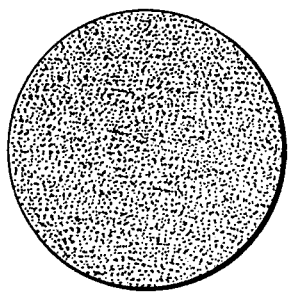
Fig. 3.
Fig. 4.
Fig. 5.
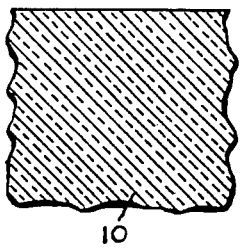
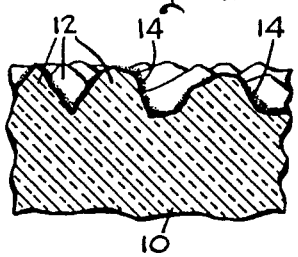
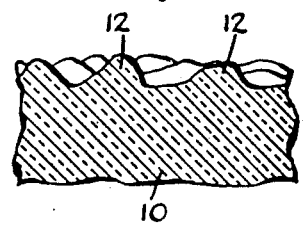
Fig. 6.
Fig. 7.
Fig. 8.
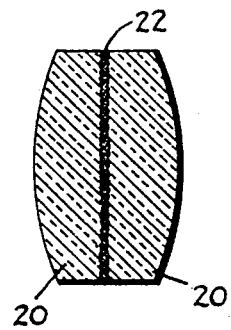
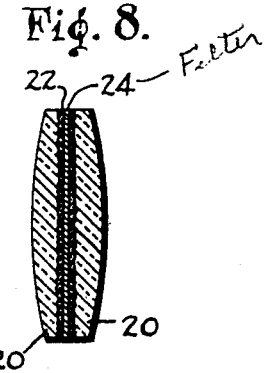
Earl W. Beck &
Victor Walker,
INVENTORS
BY Beau, Brooks, Buckley & Beau
ATTORNEYS Patented Mar. 10, 1942

2,275,602

UNITED STATES PATENT OFFICE 2,275,602

LIGHT DIFFUSING LENS

Earl W. Beck, Eggertsville, N. Y., and Victor Walker, Fort Erie, Ontario, Canada, assignors, by mesne assignments, to AlnCin, Inc., a corporation of New York Application October 3, 1938, Serial No. 232,920

8 Claims. (Cl. 88—57)

This invention relates to light modifying devices and to methods for producing the same, and has particular relation to the provision of improved forms of light transmitting glass devices which are adapted to provide optimum light transmitting efficiency in combination with homogenization of the beams of light transmitted therethrough. The invention is applicable to the construction of simple and/or compound lens devices such as are useful in the manner of condenser lenses or prior forms of light diffusing screens, or the like, in connection with light transmitting and/or projecting apparatus. For example, the invention is capable of providing improved results in connection with the manufacture of automobile headlight and flood light lenses; light projector condensing lenses; reflectors; lamp bulbs and globes; or the like, and whenever a high degree of light transmitting capacity is required in combination with light beam homogenization and directional control.

Many previous efforts have been made to provide light diffusing transparencies for various purposes but such efforts have heretofore been attended by certain serious difficulties and disadvantages such as inefficiency in light transmitting and/or diffusing function, lack of structural uniformity and functional characteristics, expense of manufacture, and the like. For instance, previously employed means for providing diffused light have included various forms of light transmitting screens such as fabric sheets, glass coating applications, ground glass, mechanically prismed glass, etched glass, and glass with included light screening particles or bubbles or stria, or the like. Such devices, however, invariably lacked either structural or functional uniformity, light transmitting efficiency, achromatic characteristics or some other characteristic of major importance; and one of the objects of the present invention is to provide an improved light diffusing transparency by a relatively inexpensive manufacturing process which may be accurately controlled to provide a selected variety of predetermined light-diffusing characteristics. Other objects of the invention will appear from the specification herein which, it will be understood, is merely exemplary of the invention.

In the drawing:

Fig. 1 is a front elevation of a light-diffusing lens constructed in accordance with the invention;

Fig. 2 is a typical section taken through the structure of Fig. 1;

Figs. 3, 4 and 5 are progressively arranged diagrammatic sectional views on a greatly magnified scale of a glass structure, showing the results of the successive manufacturing steps of the invention;

Fig. 6 is a view in section of a portion of a prismed type automobile headlight lens with the surface treating process of the invention applied thereto;

Fig. 7 is a section through a compound lens structure incorporating features of the invention; and Fig. 8 is a section through another form of compound lens structure of the invention.

In accordance with the invention a transparent base of glass is first molded or blown or ground or otherwise formed into the desired general contour according to the purpose for which the product is to be employed. For instance, in the preparation of an optical lens such as is shown in Figs. 1 and 2, the base 10 (Fig. 3) is first molded and ground to its approximate shape to provide predetermined desired optical characteristics. In the case of lamp globes, the glass base may first be molded or blown into the desired general globular contour, and in some cases may then be finished by grinding or buffing processes as may be required to provide the desired degree of contour smoothness. It will be understood that in connection with the initial preparation of the glass base, any of the well known glass molding, blowing, cutting, grinding and polishing processes may be employed.

The outer surface portions of the base are then abraded by some form of grinding, scratching, attrition, or pressing process whereby the surface contour is disrupted by series of minute serrations. For example, one form of abrading process that has proven to be particularly successful involves a fine grinding of the glass surface as by means of loose carborundum or other abrasive. Thus, as illustrated in Fig. 4 the glass base 10 is provided with a series of cusps 12 throughout its surface contour. These cusps may be of somewhat varying dimensions and proportions; but they are generally of pyramidal form as will be more fully explained hereinafter. When formed by grinding, the cusps are found to be in the form of minute and closely spaced peaks; and accretions 14 of fused glass are found to be disposed within the interstices between the cusps (Fig. 4). These accretions appear to consist of particles of glass that have become loosened from the base during the cusp producing process, and have the appearance of having been wiped into the interstices between the cusps and fused or cemented thereon under the heat of the grinding action. This accretion material is invariably of extremely low transparency, and to such an extent that a glass article made only in accordance with the steps hereinbefore defined is well known to be merely translucent and non-transparent, as is true of the case of any ground-glass product.

Ground glass plates have previously been used for light diffusing purposes, but it is well known, however, that ground glass and similar products function also as light absorbing screens, in addition to their diffusing action, and may provide as low as only 50% light transmission as compared to smooth polished glass. Consequently the use of ordinary ground glass for diffusion purposes in connection with light projecting apparatus, such as of the optical types and automobile headlight lenses, is attendant by a direct loss of a substantial portion of the illumination coming to the ground glass. This action is in all cases economically undesirable, and in some cases would be entirely impracticable.

The features of the present invention are attained by an additional step or manufacturing process wherein we treat the serrated glass base with acid for two distinct purposes. First, to remove the light reflecting and absorbing accretion material 14 from the interstices between the cusps; and second, to impart a high degree of clarify to the final surfaces of the product. For this purpose we employ a mixture of hydrofluoric and sulphuric acids in the approximate proportions of one to five, respectively, by weight, and the acid process is carried out by simply dipping the prepared base in a bath of the acid mixture at an elevated temperature and for the necessary length of time to permit a complete clearing away of the accretion material and any other locally irregular or otherwise imperfect surface material. Preferably, the glass base is alternately immersed and withdrawn from the acid bath and then rinsed with fresh water to assist in the removal of the accretion material from the base, and these steps of the process are repeated any desired number of times until a completely transparent and clarified surface is produced. There is thus produced a novel article of manufacture having a surface in the form of a series of closely packed cusps of microscopic dimensions (Fig. 5), the cusps being of relatively low domed proportions whereby each cusp provides light ray refraction and beam diffusion of a very fine order. The dispersion effects of the cusps are of course also of microscopic order, and by reason of the close relative proximities of the cusps and the multitudinous and microscopical character of the dispersion effects, substantial interference between the refracted emergent rays is established and substantial correction for color dispersion is obtained. Thus, the beam of light emitted from the surface apears to the human eye to be of uniformly diffused and achromatic character. By reason of the complete removal of the accretion material 14 between the cusps and the highly clarified nature of the finished surfaces of our material, our product by actual tests has proven to be equal in transparency to plane mechanically polished glass of the same chemical constituency. Thus, a lens of superior light diffusing and achromatic characteristics has been provided which is particularly suitable for use in connection with optical instruments, automobile headlamp or other search light lenses, illuminating lamp bulbs and globes, or the like.

It wil be apparent that the dimensions and relative arrangements of the cusps 12 may be provided of varied form, and that the form may be accurately controlled by varying the degree of fineness of the abrading or serrating operation. Preferably, the grinding operation hereinabove described is performed by means of a loose abrasive of the desired fineness under a rapidly revolving wheel of iron or other suitable material. However, it is contemplated that, in lieu of this specific form of serrating operation, sand blasting, acid etching, molding operations, or any other suitable method may be employed wherein minute cusps of the general type and order of the cusps illustrated herein are formed preparatory to the acid treatment portion of our manufacturing operation. It is also contemplated that the cusps of our invention may be of a large variety of forms and dimensional proportions as may be required to procure light transmitting and diffusing characteristics of different order. For example, we have found that for light projection apparatus of the optical types that good results may be obtained with a lens of our construction wherein the cusps are of altitudes of the order of 1/200 of an inch and measure in the region of 1/100 of an inch across their bases. However, it is contemplated that either one or both of these dimensions may be greatly varied without reference to the other.

It will be apparent that this novel process of lens manufacture involves only a few manufacturing steps of relatively simple and inexpensive character. Also, because of the fact that our finished lens is provided with a surface of mottled appearance (Fig. 1) certain imperfections in the glass base 10 may be overlooked without commercial disadvantage. For instance, the glass base material of optical lenses often includes minute gas bubbles or stria or the like which would detract from the commercial acceptance thereof when made into the conventional form of condenser lens which is clear and highly polished, and wherein the included imperfections would be revealed. Inasmuch as such imperfections have no material adverse effect upon the optical properties of the glass they may be overlooked when included in a lens constructed in accordance with our invention, because they would no longer be apparent to the eye.

Thus it will be seen that we have provided an improved light diffusing lens which is capable of transmitting light without loss. Our lens also avoids color dispersion and chromatic aberration to a substantial extent, and is produced by a relatively inexpensive and accurately controllable method. It is contemplated that our method of manufacture shall be applied to a large variety of forms of base objects and for any purpose wherein diffusion of light without transmission loss is desired. For example, our method of manufacture may be applied to good advantage to the surfaces of electric light bulbs, lamp globes, window lights, lenses, reflector, and any other form of light transmitting or reflecting glass objects.

It is also contemplated that the invention is applicable and useful in combination with any special form of lens or reflector in such manner as to provide a combination of the desirable properties of such special form of construction and the features of the present invention. For example, we have found that the present-day widely used types of prismed headlight lenses for automobiles are greatly improved by the addition of our surface treatment method. Fig. 6 illustrates the application of our invention to the surface of a lens of this type. In such case the prismed construction of the lens continues to function to direct the majority of the transmitted light toward the desired portion of the roadway ahead of the vehicle. However, the peaked construction of the facet surfaces of the lens resulting from the application of our surface treating process provides for local light ray refraction and diffusion as explained hereinabove, and thus corrects the light dispersion effects of the prism elements of the lens which would otherwise produce segregation of the transmitted light into alternate bands of relatively high and low densities. In this manner, our invention functions to eliminate the relatively dark and bright spots and bands of light that are projected forwardly upon the surface of the highway by conventional type lenses and which appear to dance up and down with movement of the automobile upon its spring supports.

Fig. 7 illustrates another application of the invention wherein a composite lens is produced through means of a simplified and improved fabrication process. It is often desirable in connection with the manufacture of optical instruments to provide composite lens structures by cementing together two or more individual lens elements. Previous methods of producing such composite structures have involved the initial preparation of the individual lens elements in complete surface polished form prior to the cementing process. That is, both faces of each of the individual lenses have first been ground and polished by buffing in the conventional manner, the contiguous faces of the adjacent lenses being carefully ground and polished so as to accurately interfit with one another. The individual lenses are then cemented together by means of balsam, nitro-cellulose cement, or some other form of cementing material having suitable optical and structural characteristics. Such processes, therefore, have heretofore involved prolonged and meticulous grinding and polishing operations upon both of the outer and inner surfaces of each individual lens element of the unit, and have therefore involved considerable labor and expense.

As distinguished from the above, our invention makes possible the production of a superior type compound lens unit at a greatly reduced cost of manufacture. In such case the individual lens elements of the unit to be produced are initially ground upon both faces to the desired contours. The lenses may then be treated in accord with the acid bath steps of our process as hereinabove described, until all surfaces are thoroughly cleaned and left in highly clarified form. The lenses are then cemented together by any of the hereinabove described forms of suitable cementing means, and a composite lens of high light transmitting characteristics will thus be produced. By reason of the peaked construction of the outer surfaces of the lens elements, this type of composite lens unit will be of light diffusing character, but will be of unimpaired light transmitting ability. If substantially non-diffusing characteristics in the composite lens are desired, the surfaces of the individual lens elements that will ultimately constitute the first and final light transmitting surfaces of the unit will be prepared in accord with the conventional grinding and polishing methods, while the inwardly disposed surfaces of the lens elements that are to be arranged in contiguous cemented relation with other lens surfaces may be prepared as described hereinabove. Thus, as illustrated in Fig. 7, the individual lens elements 20 will be of smooth outer surface contour and will be secured together by means of a suitable cement 22 at their inner contiguous surfaces which have been prepared in accordance with our invention. The cementing material 22, being of optical characteristics which are similar to the optical characteristics of the glass of the lens elements, fills the spaces between opposed cusps and interstices of the adjacent surfaces of the lens elements and provides, in effect, a single unitary lens structure. An integral composite lens structure is thus produced wherein the tendencies of the minute cusps of the internal glass surfaces to produce refraction of light transmitted therethrough is substantially obviated. The composite lens is thus enabled to transmit light in substantially unaltered form, and yet two of the lens surfaces of the unit have been produced by the relatively inexpensive manufacturing method of our invention, thus providing definite economies of manufacture. Also, the composite lens so produced is of improved structural characteristic inasmuch as the peaked internal contiguous surfaces of the lens elements thereof are of improved cement adhering character. Consequently, the cemented connection between the lens elements of the unit is of improved and more durable form.

It will also be readily understood that the principles of the construction explained hereinabove in connection with the fabrication of compound lenses is applicable with equal facility to the construction of other forms of compound light transmitting units such as color filters, diffusion discs, polarizing lenses, cemented laminated glass fabrications such as "safety glass" for use as automobile windows, or the like; wherein sheets of light filtering or diffusing or screening material are to be framed between glass plates for structural supporting purposes. In such case (as shown in Fig. 8) the sheet of polaroid or light filtering or diffusing material 24 as the case may be, may be inserted within the cementing medium 22 and upon hardening of the cement the included sheet material will be firmly supported between the glass plates 20. Thus, the previously necessary steps of carefully grinding and buffing the interior surfaces of the frame glass plates to a high polish is obviated, the inner surfaces of the plates 20 being produced by means of the economical manufacturing process of the present invention.

In the case of larger lenses, such as for example automobile headlight lenses which must of necessity be produced as inexpensively as possible, our manufacturing method is of particular advantage because in addition to the advantages described hereinabove it involves further unobvious advantages in connection with the manufacture of lenses of this type. For instance, in the manufacture of light polarizing automobile headlight lenses, the light polarizing medium employed is usually furnished in the form of a sheet of material which is frangible and may best be supported between a pair of opposed glass plates or lenses of complementary contours. Such lenses are usually formed by some molding process, but due to their size are inclined to warp upon cooling and withdrawal from the molds. Consequently, to prepare these plates of complementary surfaces for proper support of the sheet of polarizing material therebetween, the plates must be subsequently ground to accurate complementary form. Inasmuch as such grinding processes produce diminished transparency characteristics at the ground surfaces, it has previously been necessary to subsequently polish the ground surfaces by buffing or other relatively expensive polishing processes. As distinguished from this, in accordance with the present invention the complementary surfaces of the plates are cleared and polished by the acid treating steps hereinabove described subsequent to the grinding process. Thus, advantage is taken of the previous provision of the ground surfaces of the plates, and the addition of the acid treating steps of the process provides a superior type clarified and peaked surface for cemented mounting of the included sheet of polarizing material therebetween. It is also contemplated that the light color filtering, diffusing, polarizing or other light altering medium to be included between the opposed glass framing plates may be furnished in any other desired form as distinguished from the sheet form as previously described and illustrated in Fig. 8. For example, color absorbing material of the desired characteristics in either liquid or finely disseminated solid form may be previously mixed into the cementing material 22 to provide simultaneously a cementing and light altering substance of the desired optical characteristics.

Although only a limited number of forms of the invention have been shown and described in detail, it will be apparent to those skilled in the art that the invention is not so limited but that various changes may be made therein without departing from the spirit of the invention or from the scope of the appended claims.

We claim:

1. A light modifying element adapted for use in combination with a light source comprising a pair of opposed glass bodies having one or more of their optical surfaces roughened for light diffusing purposes, said roughened surfaces conforming to prescribed general contoured form thereof and being made up of relatively small irregularly arranged non-prismatic depressions and projections treated by a mixture of hydrofluoric and sulphuric acids and water so regulated and applied as to be substantially cleared of light screening substances resulting from the roughening thereof without elimination of the roughening, said glass bodies being cemented together by optical cement.

2. A light modifying element adapted for use in combination with a light source comprising a pair of opposed glass bodies having one or more of their optical surfaces roughened for light diffusing purposes, said roughened surfaces conforming to prescribed general contoured form thereof and being made up of relatively small irregularly arranged non-prismatic depressions and projections treated by a mixture of hydrofluoric and sulphuric acids and water so regulated and applied as to be substantially cleared of light screening substances resulting from the roughening thereof without elimination of the roughening, said glass bodies being cemented together by optical cement, and a light modifying medium disposed within said cement body.

3. A light modifying element adapted for use in combination with a light source comprising a pair of opposed glass bodies having one or more of their optical surfaces roughened for light diffusing purposes, said roughened surfaces conforming to prescribed general contoured form thereof and being made up of relatively small irregularly arranged non-prismatic depressions and projections treated by a mixture of hydrofluoric and sulphuric acids and water so regulated and applied as to be substantially cleared of light screening substances resulting from the roughening thereof without elimination of the roughening, said glass bodies being cemented together by optical cement, and a light modifying medium in sheet body form disposed within said cement body.

4. A light modifying element adapted for use in combination with a light source comprising a pair of opposed glass bodies having their adjacent surfaces roughened for light-diffusing purposes, said roughened surfaces conforming to prescribed general contoured form thereof and being made up of relatively small irregularly arranged non-prismatic depressions and projections treated by a mixture of hydrofluoric and sulphuric acids and water so regulated and applied as to be substantially cleared of light screening substances resulting from the roughening thereof without elimination of the roughening, said glass bodies being cemented together by optical cement.

5. The method of manufacturing a light transmitting device comprising the steps of providing a pair of glass stock pieces for fabrication into the form of a compound device, including abrading the adjacent faces of said stock pieces by means of a loose abrasive adapted to produce thereon minute cusps conforming accurately to the prescribed general contours of said surfaces, treating said abraded surfaces in a bath of hydrofluoric and sulphuric acids and water so regulated and applied as to provide substantially complete removal from said abraded surfaces of light screening substances resulting from said abrading without elimination of said cusps, and cementing said prepared stock pieces together by means of a cementing substance having a light modifying medium in sheet form disposed therewithin.

6. The method of manufacturing a light transmitting device comprising the steps of providing a pair of glass stock pieces for fabrication into the form of a compound device, including abrading the adjacent faces of said stock pieces by means of a loose abrasive adapted to produce thereon minute cusps conforming accurately to the prescribed general contours of said surfaces, treating said abraded surfaces in a bath of hydrofluoric and sulphuric acids and water so regulated and applied as to provide substantially complete removal from said abraded surfaces of light screening substances resulting from said abrading without elimination of said cusps, and cementing said prepared stock pieces together by means of a cementing substance.

7. The method of manufacturing a light transmitting device comprising the steps of shaping a glass stock piece into the form of a prismed lens having its prismed surfaces conforming generally to prescribed contours and of locally irregularly cusped form, treating said cusped surfaces with a mixture of hydrofluoric and sulphuric acids and water so regulated and applied as to substantially clear said surfaces of light screening substances without elimination of said cusped form.

8. As a new article of manufacture, a light transmitting device substantially identical with that obtained by the method of claim 7.

EARL W. BECK.
VICTOR WALKER.